United States Patent
Oshima et al.

(10) Patent No.: US 6,639,021 B2
(45) Date of Patent: Oct. 28, 2003

(54) COMPOSITION OF CYCLIC OLEFIN ADDITION COPOLYMER AND CROSS-LINKED MATERIAL

(75) Inventors: Noboru Oshima, Suzuka (JP); Yooichiroh Maruyama, Yokkaichi (JP); Nobuyuki Sakabe, Yokkaichi (JP); Katsutoshi Sawada, Yokkaichi (JP); Kenzo Ohkita, Yokkaichi (JP); Yuuichi Hashiguchi, Yokkaichi (JP); Tarou Kanamori, Yokkaichi (JP); Kouji Kawahara, Yokkaichi (JP)

(73) Assignee: JSR Corporation, Tokyo (JP)

( * ) Notice: Subject to any disclaimer, the term of this patent is extended or adjusted under 35 U.S.C. 154(b) by 81 days.

(21) Appl. No.: 09/968,529

(22) Filed: Oct. 2, 2001

(65) Prior Publication Data

US 2002/0042461 A1 Apr. 11, 2002

(30) Foreign Application Priority Data

| Oct. 4, 2000 | (JP) | ............................... 2000-305148 |
| Dec. 22, 2000 | (JP) | ............................... 2000-391021 |
| Jan. 30, 2001 | (JP) | ............................... 2001-021743 |
| Jun. 26, 2001 | (JP) | ............................... 2001-192802 |

(51) Int. Cl.$^7$ .................. C08L 45/00; C08L 83/00; C08L 83/04; B32B 27/28

(52) U.S. Cl. ................ 525/326.5; 525/340; 525/342; 428/428; 428/446

(58) Field of Search .................. 525/326.5, 340, 525/342; 428/428, 446

(56) References Cited

U.S. PATENT DOCUMENTS

| 5,159,014 A | 10/1992 | Tsutsumi et al. |
| 5,731,129 A | 3/1998 | Koshimura et al. |
| 5,912,313 A | 6/1999 | McIntosh, III et al. |
| 6,121,340 A | 9/2000 | Shick et al. |
| 6,455,650 B1 * | 9/2002 | Lipian et al. ............... 526/171 |
| 2002/0103317 A1 * | 8/2002 | Zhao et al. ................. 526/268 |

FOREIGN PATENT DOCUMENTS

EP 0 758 657 2/1997

* cited by examiner

Primary Examiner—D. R. Wilson
(74) Attorney, Agent, or Firm—Oblon, Spivak, McClelland, Maier & Neustadt, P.C.

(57) ABSTRACT

A composition comprising a cyclic olefin addition copolymer containing recurring units of the following formulas (1) and (2),

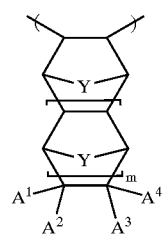

(1)

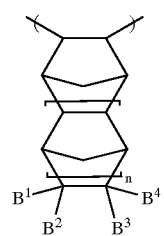

(2)

and at least one compound selected from (A) a compound acting as an acid when heated to 50° C. or higher, (B) a metal compound of an alkoxy compound, aryloxy compound, carboxyl compound, β-diketone compound, halogen compound, or oxide, (C) an organic carboxylic acid, organic phosphoric acid, organic sulfonic acid, ammonia, primary to tertiary amine compound, or quaternary ammonium hydroxide compound. The composition exhibits excellent optical transparency, solvent resistance, dimensional stability, heat resistance, and adhesion to metals and inorganic materials, and suitable for use in optical transparent materials and electronic material parts, to a cross-linked product obtained by crosslinking the composition via siloxane bonds, and to a film, sheet, or coating made from the composition.

16 Claims, No Drawings

COMPOSITION OF CYCLIC OLEFIN ADDITION COPOLYMER AND CROSS-LINKED MATERIAL

BACKGROUND OF THE INVENTION

1. Field of the Invention

The present invention relates to a composition comprising an addition copolymer of cyclic olefins having an alkoxysilyl functional group, a cross-linked material made from the composition, and a film, sheet, or coating made from the composition.

More particularly, the present invention relates to a composition comprising an addition copolymer of cyclic olefins having an alkoxysilyl functional group exhibiting excellent optical transparency, solvent resistance, dimensional stability, heat resistance, and adhesion to metals and inorganic materials, and suitable for use in optical transparent materials and electronic material parts, to a cross-linked product obtained by crosslinking the composition via siloxane bonds, and to a film, sheet, or coating made from the composition.

2. Description of the Background Art

In recent years, to respond to the requirements for lightening, miniaturization, and high integration of optical parts and liquid crystal display elements, substitution of transparent optical resins for inorganic glass in the field of these parts is ongoing. For this reason, further improvement in heat resistance, chemical resistance, dimensional stability, glueing, and adhesion, in addition to optical transparency of resin materials is desired.

Ring-opening polymers of cyclic olefin compounds and their hydrogenated compounds have conventionally been known as materials exhibiting excellent transparency. Many such polymers, however, are inadequate as a glass substitute because of poor heat resistance due to a low glass transition temperature of 200° C. or less.

On the other hand, addition copolymers of norbornene compound disclosed by Japanese Patent Applications Laid-open No. 4-63807 and No. 8-198919, Published Japanese translation of PCT Applications No. 9-508649 and No. 11-505880 have a glass transition temperature of above 200° C. and exhibit superior transparency.

However, these addition (co)polymers are not only difficult to cross-link because of the absence of cross-linking points, but also exhibit inferior dimensional stability, solvent resistance, and chemical resistance.

Japanese Patent Application Laid-open No. 2001-98026 discloses a method of introducing functional groups such as a hydroxyl group to a polymer as a cross-linking point and cross-linking the polymer using a polyfunctional crosslinking agent such as a dicarboxylic acid, e.g. maleic acid, or epoxy resin. However, improvement in the dimensional stability, solvent resistance, and chemical resistance of the resulting cross-linking film obtained using this method is insufficient. To improve these properties, polymer molecules must be directly cross-linked via functional groups introduced in the polymer molecules, without using a cross-linking agent.

One specific method is to introduce unsaturated double bonds to the polymer molecules and cross-link the polymer using a peroxide. However, no sufficient degree of cross-linking can be achieved nor can a product with improved resistance to oxidative degradation be obtained by using this method because of the reaction of the peroxide with an antioxidant which is added to prevent degradation of the polymer by oxidation. A method of irradiating UV lights to cross-link the unsaturated double bonds without using a peroxide may be employed. However, if exposed to strong UV lights with an intension of achieving a high degree of cross-linking, the polymer may be oxidized and become yellow, resulting in impaired transparency.

A method of introducing an alkoxysilyl functional group in the polymer and cross-linking the polymer via siloxane bonds by hydrolysis and condensation can reduce the effect of an antioxidant added to the polymer.

U.S. Pat. No. 5,912,313 discloses a cross-linked polymer with improved solvent resistance obtained by heating an addition (co)polymer of norbornene containing an alkoxysilyl functional group at 300° C. A problem with this technique is degradation of the polymer due to oxidation which occurs when the polymer is heated at 300° C. in oxygen.

WO 98/20394 discloses a composition comprising a norbornene addition copolymer which contains an alkoxysilyl functional group and a photo acid generator (photoinitiator), and a method of forming a cross-linked polymer by irradiating the spin-coated thin film of the composition with UV lights. Irradiation with strong UV lights, however, may change the color of the polymer to yellow. In addition, it is difficult to homogeneously cross-link the polymer over the entire film or sheet which is thicker than a thin film made by spin-coating. Moreover, when the composition contains a photo acid generator, specific cross-linking conditions must be satisfied in which UV rays are blocked to prevent any problems due to cross-linking during storage of the composition or the manufacture of a film or sheet. A more convenient cross-linking method has therefore been desired.

In addition to these problems, cross-linking of a polymer accompanies various changes in the polymer properties such as an increase in the solvent resistance and a decrease in the coefficient of linear expansion (or an increase of dimensional stability), which are not dealt with by U.S. Pat. No. 5,912,313 nor WO98/20394.

The present invention has been achieved to solve the above problems and has an objective of providing a composition comprising an addition copolymer of cyclic olefins having an alkoxysilyl functional group exhibiting excellent optical transparency, solvent resistance, dimensional stability, heat resistance, and adhesion to metals and inorganic materials, and being suitable for use in optical transparent materials and electronic material parts, a cross-linked product obtained by cross-linking the composition via siloxane bonds, a method of manufacturing the cross-linked material which is substantially free from degradation by oxidation, a method of manufacturing a cross-linked material by cross-linking this composition by siloxane bonds and a cross-linked material substantially free from deterioration by oxidation, a film or sheet comprising the composition or cross-linked material, a coating agent comprising the composition, and a coating film comprising the cross-linked material.

As a result of extensive studies, the inventors of the present invention found that the problems due to cross-linking during storage of the composition or manufacture of a film or a sheet can be prevented by using the composition of the present invention without employing specific cross-linking conditions in which UV rays are blocked, and that a cross-linked material which is substantially free from degradation by oxidation can be manufactured by heating the composition at 50° C. or more, optionally by causing water or steam at 50° C. or more to come contact with the composition.

SUMMARY OF THE INVENTION

Accordingly, the present invention provides a composition comprising:

an addition copolymer of cyclic olefins which contains a recurring unit (a) shown by the following formula (1),

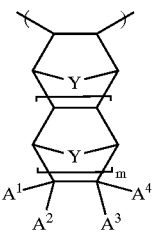
(1)

wherein $A^1$ to $A^4$ individually represent a hydrogen atom, a hydrocarbon group having 1–20 carbon atoms, or an alkoxysilyl group or aryloxysilyl group represented by the formula —$(CR^1R^2)_f Si(OR^3)_g R^4_{(3-g)}$, —$(CR^1R^2)_f Si(R^3R^4)OSi(OR^3)_g R^4_{(3-g)}$, or —$(CR^1R^2)_f C(O)O(CH_2)_n Si(OR^3)_g R^4_{(3-g)}$ (wherein $R^1$ and $R^2$ individually represent a hydrogen atom or hydrocarbon group having 1–20 carbon atoms, $R^3$ is an alkyl group, alkenyl group, aryl group, or cycloalkyl group, each having 10 or less carbon atoms, $R^4$ is a hydrogen atom, halogen atom, or hydrocarbon group having 1–20 carbon atoms, f and h are an integer of 0–5, and g is an integer of 1–3), provided that at least one of $A^1$ to $A^4$ is an alkoxysilyl group or aryloxysilyl group, Y represents —$CH_2$— or —O—, and m is 0 or 1, and a recurring unit (b) shown by the following formula (2),

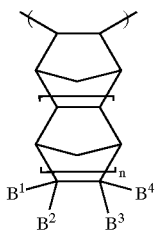
(2)

wherein $B^1$, $B^2$, $B^3$, and $B^4$ individually represent a hydrogen atom or an alkyl group, aryl group, alkenyl group, or cycloalkyl group each having 20 or less carbon atoms, a halogen atom, a halogenated hydrocarbon group, or a polar group represented by —$(CH_2)_j X$ (wherein X represents a group —$C(O)OR^5$ or —$OC(O)R^6$, wherein $R^5$ and $R^6$ represents an alkyl group, alkenyl group, aryl group, cycloalkyl group, or derivatives of these groups, each having 20 or less carbon atoms, or halogen-substituted groups of these groups, and j is an integer of 0–5), or $B^1$ and $B^2$ or $B^3$ and $B^4$ may form an alkylidenyl group in combination, or $B^1$ and $B^4$, $B^1$ and $B^3$, $B^2$ and $B^3$, or $B^2$ and $B^4$ may form a cycloalkylene group or cycloalkenylene group in combination, and n is an integer of 0–2, and at least one compound selected from (A) a compound acting as an acid when heated to 50° C. or higher, (B) a metal compound of an alkoxy compound, aryloxy compound, carboxyl compound, β-diketone compound, halogen compound, or oxide, the metal being selected from the group consisting of Al, Ga, Sn, Ca, Ba, Zn, Sb, Ti, Zr, Sc, Y, Ce, Nd, Sm, and Yb, and (C) a compound selected from the group consisting of an organic carboxylic acid, organic phosphoric acid, organic sulfonic acid, ammonia, primary to tertiary amine compound, and quaternary ammonium hydroxide compound.

In the above composition, the cyclic olefin addition copolymer preferably contains 0.1–30 mol % of the recurring unit (a) shown by the formula (1) and 70–99.9 mol % of the recurring unit (b) shown by the formula (2), provided that the total of the recurring unit (a) and the recurring unit (b) is 100 mo %.

In the above composition, the glass transition temperature of the cyclic olefin addition copolymer is preferably 200° C. or more.

The above composition preferably comprises at least one compound (A).

In the above composition, the compound (A) is preferably a phosphorous acid ester compound or a hypophosphorous acid ester compound, or both.

The above composition preferably comprises at least one compound (B) selected from the group consisting of:

a divalent tin compound shown by the following formula (3),

$$Sn(R^7)_2 \qquad (3)$$

wherein $R^7$ represents a carboxyl group having 1–20 carbon atoms, β-diketone group, alkoxyl group having 1–15 carbon atoms, phenoxy group, or halogen atom, a tetravalent tin compound shown by the following formula (4),

$$Sn(R^8)_{4-n}(R^7)_n \qquad (4)$$

wherein $R^7$ is the same as defined in formula (3), $R^8$ represents a hydrocarbon group having 1–15 carbon atoms or a halogen atom, and n is in integer of 0–4, and a tetravalent tin oxide shown by the following formula (5),

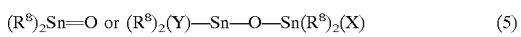

$$(R^8)_2 Sn=O \text{ or } (R^8)_2(Y)-Sn-O-Sn(R^8)_2(X) \qquad (5)$$

wherein $R^8$ is the same as defined for the formula (4), and X and Y individually indicate a hydroxyl group, halogen atom, or isothiocyanate group.

The above composition preferably further comprises at least one compound selected from the group consisting of an organosilane shown by the following formula (6),

$$(R^9)_q Si(OR^{10})_{4-q} \qquad (6)$$

wherein $R^9$ individually, when two or more are present, represents an organic group having 1–10 carbon atoms, $R^{10}$ individually represents an alkyl group having 1–5 carbon atoms or an acyl group having 1–6 carbon atoms, and q is an integer from 0–2, hydrolyzate of the organosilane, and condensate of the organosilane.

The above composition preferably further comprises particles of at least one metal oxide selected from the group consisting of silica, alumina, zirconia, titania, diatomite, montmorillonite, and tin oxide.

The present invention further provides a cross-linked material produced by cross-linking an addition copolymer of cyclic olefins in a composition containing the cyclic olefin addition copolymer via siloxane bonds, wherein the cyclic olefin addition copolymer contains a recurring unit (a) shown by the following formula (1),

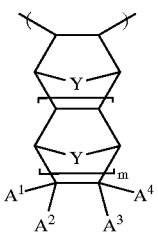

(1)

wherein $A^1$ to $A^4$ individually represent a hydrogen atom, a hydrocarbon group having 1–20 carbon atoms, or an alkoxysilyl group or aryloxysilyl group represented by the formula $-(CR^1R^2)_f Si(OR^3)_g R^4_{(3-g)}$, $-(CR^1R^2)_f Si(R^3 R^4)OSi(OR^3)_g R^4_{(3-g)}$, or $-(CR^1R^2)_f C(O)O(CH_2)_h Si(OR^3)_g R^4_{(3-g)}$, (wherein $R^1$ and $R^2$ individually represent a hydrogen atom or hydrocarbon group having 1–20 carbon atoms, $R^3$ is an alkyl group, alkenyl group, aryl group, or cycloalkyl group, each having 10 or less carbon atoms, $R^4$ is a hydrogen atom, halogen atom, or hydrocarbon group having 1–20 carbon atoms, f and h are an integer of 0–5, and g is an integer of 1–3), provided that at least one of $A^1$ to $A^4$ is an alkoxysilyl group or aryloxysilyl group, Y represents $-CH_2-$ or $-O-$, and m is 0 or 1, and a recurring unit (b) shown by the following formula (2),

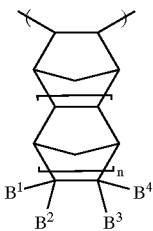

(2)

wherein $B^1$, $B^2$, $B^3$, and $B^4$ individually represent a hydrogen atom or an alkyl group, aryl group, alkenyl group, or cycloalkyl group each having 20 or less carbon atoms, a halogen atom, a halogenated hydrocarbon group, or a polar group represented by $-(CH_2)_j X$ (wherein X represents a group $-C(O)OR^5$ or $-OC(O)R^6$, wherein $R^5$ and $R^6$ represents an alkyl group, alkenyl group, aryl group, cycloalkyl group, or derivatives of these groups, each having 20 or less carbon atoms, or halogen-substituted groups of these groups, and j is an integer of 0–5), or $B^1$ and $B^2$ or $B^3$ and $B^4$ may form an alkylidenyl group in combination, or $B^1$ and $B^4$, $B^1$ and $B^3$, or $B^2$ and $B^4$ may form a cycloalkylene group or cycloalkenylene group in combination, and n is an integer of 0–2, and said composition further comprises at least one compound selected from (A) a compound acting as an acid when heated to 50° C. or higher, (B) a metal compound of an alkoxy compound, aryloxy compound, carboxyl compound, β-diketone compound, halogen compound, or oxide, the metal being selected from the group consisting of Al, Ga, Sn, Ca, Ba, Zn, Sb, Ti, Zr, Sc, Y, Ce, Nd, Sm, and Yb, and (C) a compound selected from the group consisting of an organic carboxylic acid, organic phosphoric acid, organic sulfonic acid, ammonia, primary to tertiary amine compound, and quaternary ammonium hydroxide compound.

The above cross-linked material preferably comprises not more than 10 wt % of toluene soluble components.

The above cross-linked material preferably has a degree of swelling in the toluene measured at 25° C. of 300% or less.

The above cross-linked material preferably has a coefficient of linear expansion determined at 80° C. of 70 ppm/° C. or less.

The above cross-linked material is preferably a film, sheet, or coating.

Other objects, features and advantages of the invention will hereinafter become more readily apparent from the following description.

DETAILED DESCRIPTION OF THE INVENTION AND PREFERRED EMBODIMENTS

The present invention will be described in more detail below.

The recurring unit (a) of the formula (1) in the cyclic olefin addition copolymer having an alkoxysilyl functional group of the present invention can be formed by the addition polymerization of a cyclic olefin shown by the following formula (1)' (hereinafter referred to as "specific cyclic olefin (1)"),

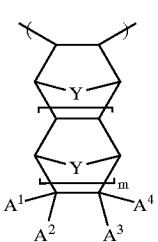

(1)' wherein $A^1$ to $A^4$, Y, and m are the same as defined for the formula (1).

The following compounds can be given as specific examples of such a specific cyclic olefin (1):
5-trimethoxysilyl-2-norbornene.
5-trimethoxysilyl-7-oxa-2-norbornene,
5-dimethoxychlorosilyl-2-norbornene,
5-dimethoxychlorosilyl-7-oxa-2-norbornene,
5-methoxychloromethylsilyl-2-norbornene,
5-methoxyhydridemethylsilyl-2-norbornene,
5-dimethoxyhydridesilyl-2-norbornene,
5-methoxydimethylsilyl-2-norbornene,
5-triethoxysilyl-2-norbornene,
5-triethoxysilyl-7-oxa-2-norbornene,
5-diethoxychlorosilyl-2-norbornene,
5-ethoxychloro-methylsilyl-2-norbornene,
5-diethoxyhydridesilyl-2-norbornene,
5-ethoxydimethylsilyl-2-norbornene,
5-ethoxydiethylsilyl-7-oxa-2-norbornene,
5-propoxydimethylsilyl-2-norbornene,
5-tripropoxysilyl-2-norbornene,
5-triphenoxysilyl-2-norbornene,
5-trimethoxysilylmethyl-2-norbornene,
5-(2-trimethoxysilyl)ethyl-2-norbornene,
5-(2-dimethoxychlorosilyl)ethyl-2-norbornene,
5-(1-trimethoxysilyl)ethyl-2-norbornene,
5-(2-trimethoxysilyl)propyl-2-norbornene,
5-(1-trimethoxysilyl)propyl-2-norbornene,
5-triethoxysilylethyl-7-oxa-2-norbornene,
5-dimethoxymethylsilylmethyl-2-norbornene,
5-trimethoxypropylsilyl-2-norbornene,
5-triethoxysiloxy-dimethylsilyl-2-norbornene,
8-triethoxysilyl-3-tetracyclo[4.4.0.1$^{2,5}$.1$^{7,10}$]dodecene,
8-methyldimethoxysilyl-3-tetracyclo[4.4.0.1$^{2,5}$.1$^{7,10}$] dodecene, 8-triethoxysiloxy-dimethylsilyl-3-tetracyclo-[4.4.0.1$^{2,5}$.1$^{7,10}$] dodecene,
5-trimethoxysiloxy-dimethylsilyl-2-norbornene,
5-methyldimethoxysiloxy-dimethylsilyl-2-norbornene,
trimethoxysilylpropyl 5-norbornene-2-carboxylate,
triethoxysilylpropyl 5-norbornene-2-carboxylate,
dimethoxysilylpropyl 5-norbornene-2-carboxylate,
trimethoxysilylpropyl 2-methyl-5-norbornene-2-carboxylate,
triethoxysilylpropyl 2-methyl-5-norbornene-2-carboxylate, and
dimethoxysilylpropyl 5-methyl-5-norbornene-2-carboxylate.

The content of the recurring unit (a) in the cyclic olefin addition copolymer having an alkoxysilyl functional group is 0.2–30 mol %, preferably 0.5–20 mol %, and still more preferably 1.0–10 mol %. If the content of the recurring unit (a) in the cyclic olefin addition copolymer having an alkoxysilyl functional group is less than 0.2 mol %, it becomes difficult to form a cross-linking product. If the content exceeds 30 mol %, anti-hygroscopicity and dimensional stability tend to be impaired.

As another method of forming the recurring unit (a) of the formula (1), a method of copolymerizing a cyclic olefin having a trichlorosilyl group or a dichloroalkylsilyl group (hereinafter referred to as "specific cyclic olefin (2)") by the addition copolymerization and reacting a trichlorosilyl group or dichloroalkylsilyl group in the resulting copolymer with an alkoxide compound or aryloxide compound of alkali metal, or reacting such a copolymer with an alcohol or phenol compound in the presence of an amine compound can be given.

The following compounds can be given as specific examples of such a specific cyclic olefin (2):
5-trichlorosilyl-2-norbornene,
5-trichlorosilyl-7-oxa-2-norbornene,
5-dichloromethylsilyl-2-norbornene,
5-dichloroethylsilyl-2-norbornene,
trichlorosilylpropyl 5-norbornene-2-carboxylate,
trichlorosilylpropyl 2-methyl-5-norbornene-2-carboxylate,
and dichloromethylsilylpropyl 5-norbornene-2-carboxylate.

The recurring unit (b) of the formula (2), which is used together with recurring unit (a) of the formula (1) in the cyclic olefin addition copolymer having an alkoxysilyl functional group of the present invention, can be formed by the addition polymerization of a cyclic olefin shown by the following formula (2)' (hereinafter referred to as "specific cyclic olefin (3)"),

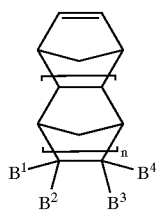

(2)' wherein B$^1$ to B$^4$, and n are the same as defined for the formula (2).

The following compounds can be given as specific examples of such a specific cyclic olefin (3):
2-norbornene, 5-methyl-2-norbornene, 5-ethyl-2-norbornene,
5-propyl-2-norbornene, 5-butyl-2-norbornene,
5-pentyl-2-norbornene, 5-hexyl-2-norbornene,
5-heptyl-2-norbornene, 5-octyl-2-norbornene,
5-decyl-2-norbornene, 5-dodecyl-2-norbornene,
5-vinyl-2-norbornene, 5-allyl-2-norbornene,
5-butenyl-2-norbornene, 5-methylidene-2-norbornene,
5-ethylidene-2-norbornene, 5-isopropylidene-2-norbornene,
5,6-dimethyl-2-norbornene, 5-methyl-5-ethyl-2-norbornene,
5,6-benz-2-norbornadiene, 5-phenyl-2-norbornene,
2,5-norbornadiene, 5-methyl-2,5-norbornadiene,
5-cyclohexyl-2-norbornene, 5-fluoro-2-norbornene,
5-chloro-2-norbornene, methyl 5-norbornene-2-carboxylate,
ethyl 5-norbornene-2-carboxylate,
butyl 5-norbornene-2-carboxylate,
methyl 2-methyl-5-norbornene-2-carboxylate,
ethyl 2-methyl-5-norbornene-2-carboxylate,
propyl 2-methyl-5-norbornene-2-carboxylate,
butyl 2-methyl-5-norbornene-2-carboxylate,
methyl 2-ethyl-5-norbornene-2-carboxylate,
trifluoroethyl 2-methyl-5-norbornene-2-carboxylate,
ethyl 2-methyl-5-norbornen-2-ylacetate,
5-norbornene-2-spiro-N-phenylsuccinimide,
5-norbornene-2-spiro-N-cyclohexylsuccinimide,
5-norbornene-2-spiro-N-methylsuccinimide,
5-norbornene-2,3-N-phenyldicarboxyimide,
5-norbornene-2,3-N-cyclohexyldicarboxyimide,
2-methyl-5-norbornene acrylate,
2-methyl-5-norbornene methacrylate,
dimethyl 5-norbornene-2,3-dicarboxylate,
diethyl 5-norbornene-2,3-dicarboxylate,
3-tricyclo[4.3.0.1$^{2,5}$]decene,
3,7-tricyclo[4.3.0.1$^{2,5}$]decadiene(dicyclopentadiene),
3-tetracyclo[4.4.0.1$^{2,5}$.1$^{7,10}$]dodecene,
8-methyl-3-tetracyclo[4.4.0.1$^{2,5}$.1$^{7,10}$]dodecene,
8-ethylidene-3-tetracyclo[4.4.0.1$^{2,5}$.1$^{7,10}$]dodecene,
8-methyl-8-methoxycarbonyl-3-tetracyclo[4.4.0.1$^{2,5}$.1$^{7,10}$]dodecene,
and 8-methyl-8-ethoxycarbonyl-3-tetracyclo-[4.4.0.1$^{2,5}$.1$^{7,10}$]dodecene.

The compounds shown by the formula (2)' for forming the recurring unit (b) may be used either individually or in combination of two or more.

The content of the recurring unit (b) in the cyclic olefin addition copolymer having an alkoxysilyl functional group is 70–99.8 mol %, preferably 80–99.5 mol %, and still more preferably 90–99 mol %. If the content of the recurring unit (b) is less than 70 mol %, glass transition temperature may decrease. If the content exceeds 99.8 mol %, cross-linking becomes difficult.

The recurring unit (a) shown by the formula (1) can also be formed by using a specific cyclic olefin compound shown by the above formula (2)' and modifying the reaction product. An example which can be given is a method of copolymerizing at least one compound selected from the group consisting of a norbornadiene compound, a compound having an alkenyl substituent, and a compound having a vinylidenyl substituent (hereinafter referred to as "specific cyclic olefin (4)") by the addition copolymerization, and reacting unsaturated double bonds in the resulting copolymer with an alkoxysilane compound having an Si—H bond in the presence of a catalyst such as a Pt compound, Rh compound, or Ru compound.

The following compounds can be given as specific examples of such a specific cyclic olefin (4):
2,5-norbornadiene, 7-oxa-2,5-norbornadiene,
5-methyl-2,5-norbornadiene, 5-vinyl-2-norbornene,
5-vinyl-7-oxa-2-norbornene, 5-allyl-2-norbornene,
5-butenyl-2-norbornene, 5-methylidene-2-norbornene, 5-ethylidene-2-norbornene, 5-ethylidene-7-oxa-2-norbornene,
5-isopropylidene-2-norbornene, and
8-ethylidene-3-tetracyclo[4.4.0.1$^{2,5}$.1$^{7,10}$]dodecene.

The following compounds can be given as specific examples of an alkoxysilane compound having an Si—H bond: trimethoxysilane, triethoxysilane, tripropoxysilane, dimethoxysilane, diethoxy silane, dimethoxychlorosilane, diethoxychlorosilane, dimethoxymethylsilane, diethoxymethylsilane, dimethoxyphenylsilane, diethoxyphenylsilane, monomethoxydimethylsilane, monoethoxydimethylsilane, and monoethoxydiethylsilane.

As a hydrosilation catalyst, $H_2PtCl_6 \cdot H_2O$, $Pt/Al_2O_3$, $RhCl(PPh_3)_2$, $Rh/Al_2O_3$, $RuCl_3$, $IrCl_3$, $FeCl_3$, $AlCl_3$, $PdCl_2 \cdot 2H_2O$, $NiCl_2$, $TiCl_4$, and the like can be given.

The cyclic olefin copolymer of the present invention can be prepared by the addition copolymerization of a specific cyclic olefin (1) having a reactive silyl group and a specific cyclic olefin (3).

The reaction is carried out as follows.

(A) A multiple component catalyst comprising the following compounds 1), 2), and 3) is used.

1) Transition metal compound: at least one compound selected from the group consisting of, an organic carboxylate, organic phosphite, organic phosphate, organic sulfonate, and β-diketonato of nickel, cobalt, or palladium. As examples of such a compound, nickel acetate, nickel octanoate, nickel 2-ethylhexanoate, nickel naphthenate, nickel oleate, nickel stearate, nickel dibutylphosphite, nickel dibutylphosphate, nickel dioctylphosphate, nickel salt of dibutylphosphate, nickel dodecylbenzenesulfonate, nickel p-toluenesulfonate, nickel bis(acetylacetonate), nickel bis(acetylacetate), cobalt (II) 2-ethylhexanoate, cobalt (III) 2-ethylhexanoate, cobalt (II) dodecanoate, cobalt (II) naphthenate, cobalt (II) versatate, cobalt (III) tris(acetylacetonate), palladium acetate, palladium 2-ethylhexanoate, and palladium bis(acetylacetonate), and the like;

a pre-formed compound made from the above organic carboxylate of nickel, cobalt, or palladium and a super acid such as hexafluoro antimonic acid, tetrafluoro boric acid, trifluoro acetic acid, or hexafluoro acetone;

a complex in which a diene or triene coordinates to nickel, such as a nickel complex of 1,5-cyclooctadiene, [(η$^3$-crotyl)Ni(cyclooctadiene)][B((CF$_3$)2C$_6$H$_4$)$_4$], [cyclododecatriene]nickel, or bis[norbornadiene]nickel;

a complex in which a ligand containing a P, N, or O atom coordinates to nickel, such as bis(triphenylphosphine)nickel dichloride, bis(triphenylphosphine)nickel dibromide, bis(triphenylphosphine)cobalt dibromide, bis(tris-tolylphosphine)nickel dichloride, bis[N-(3-tert-butylsalicylidene)phenylaminato]Ni, Ni[PhC(O)CHPPh$_2$](Ph)(PPh$_3$), Ni(OC(O)(C$_6$H$_4$)PPh$_2$)(H)(PCy$_3$), Ni[OC(O)(C$_6$H$_4$)PPh$_2$](H)(PPh$_3$), a reaction product of Ni(COD)$_2$ and PPh$_3$=CHC(O)Ph, and [(ArN=CHC$_6$H$_3$(O)(Anth))(Ph)(PPh$_3$)Ni, wherein Ar represents 2,6-(Pr)$_2$C$_6$H$_3$; Pr, isopropyl; Anth, 9-anthracene; Ph, phenyl; Cy, Cyclohexyl; and COD, 1,5-cyclooctadien.

2) An organoaluminum compound

At least one compound selected from organoaluminum compounds such as methyl almoxane, ethyl almoxane, butyl almoxane, methyl almoxane in which trialkyl aluminum is partially mixed, trimethyl aluminum, triethyl aluminum, triisobutyl aluminum, diisobutyl aluminum hydride, diethyl aluminum chloride, ethyl aluminum sesquichloride, ethyl aluminum dichloride. Among these, an organoaluminum compound containing at least methyl almoxane is preferable.

3) A compound to improve polymerization activity

A non-conjugated diene compound such as 1,5-cyclooctadiene, and 1,5,9-cyclododecatriene. A compound of boron or aluminum showing Lewis-acidity, such as a complex of an ether, amine, phenol, or the like with boron trifluoride, a complex of an ether, amine, phenol, or the like with trifluoro aluminum, tri(pentafluorophenyl)borane, tri(3,5-di-trifluoromethylphenyl)borane, tri(pentafluorophenyl) aluminum, and the like. At least one compound selected from ionic boron compounds such as triphenylcarbenium tetrakis(pentafluorophenyl)borate, triphenylcarbenium tetrakis(3,5-di-trifluoromethylphenyl)borate, tributylammonium tetrakis(pentafluorophenyl)borate, N,N-dimethylanilinium tetrakis(pentafluorophenyl)borate, N,N-diethylanilinium tetrakis(pentafluorophenyl)borate, and the like.

(B) The following compounds can be given as examples of a one-component catalyst.

B-1) Compounds shown by the following formula (7),

$$[L^1L^2ML^3]^+[A]^- \quad (7)$$

wherein M represents Ni, Co, or Pd, $L^1$, $L^2$, and $L^3$ indicate a ligand of M, wherein only one ligand has a σ bond and 1–3 π bonds are possessed by the all ligands, and A represents a counter anion. Specifically, $L^1$, $L^2$, and $L^3$ represent a compound selected from the group consisting of a cyclodiene having 6–20 carbon atoms, norbornadiene having 6–20 carbon atoms, cyclotriene having 10–20 carbon atoms, and aromatic compound having 6–20 carbon atoms. $BF_4^-$, $PF_6^-$, $SbF_5SO_3F^{-,\ AlF}{}_3SO_3CF_3^-$, $AsF_6^-$, $SbF_6^-$, $AsF_6^-$, $CF_3CO_2^-$, $C_2F_5CO_2^-$, $CH_3C_6H_4SO_3^-$, $B[C_6F_5]_4^-$, and $B[C_6H_3(CF_3)_2]_4^-$ are preferable as a counter anion represented by A.

B-2) An arene complex of $Ni(C_6F_5)_2$ or $Ni(SiCl_3)_2$

B-3) A palladium complex shown by the following formula (8):

$$[Pd(II)(L^4)_4][A]_2 \quad (8)$$

wherein A is the same as defined in B-1, and L4 indicates a nitrile compound, tertiary amine compound, or triaryl phosphine compound.

The following compounds can be given as specific examples of B-1, B-2, and B-3.

B-1)
[(η$^3$-crotyl)Ni(cyclooca-1,5-diene)][B((CF$_3$)$_2$C$_6$H$_3$)$_4$],
[(η$^3$-crotyl)Ni(cyclooca-1,5-diene)][PF6],
(PPh$_3$)(C$_6$H$_5$)Ni(Ph$_2$PCH=C(O)Ph),
(6-methoxy-bicyclo[2.2.1]hept-2-ene-end-5σ,2π)-Pd(cyclooca-1,5-diene)][PF$_6$],
[(6-methoxy-bicyclo[2.2.1]hept-2-ene-end-5σ,2π)-Pd(cyclooca-1,5-diene)][SbF$_6$],
[(η$^3$-ally)Pd][SbF$_6$] obtained from [(η$^3$-ally)PdCl]$_2$ and AgSbF$_6$,
[(η$^3$-ally)Pd][BF$_4$] obtained from [(η$^3$-ally)PdCl]$_2$ and AgBF$_4$,
[(η$^3$-crotyl)Pd(cyclooca-1,5-dien)][PF$_6$],
[Ph$^3$PPdCH$_3$][B((CF$_3$)$_2$C$_6$H$_3$)$_3$], and
[(cylcloocta-1,5-diene)Pd(CH$_3$)Cl][B((CF$_3$)$_2$C$_6$H$_3$)$_3$]

B-2)
toluene.Ni(C$_6$F$_5$)$_2$, xylene.Ni(C$_6$F$_5$)$_2$,
mesitylene.Ni(C$_6$F$_5$)$_2$, and toluene.Ni(SiCl$_3$)$_2$.

B-3)
[Pd(CH$_3$CN)$_4$][BF$_4$]$_2$, [Pd(C$_6$H$_5$CN)$_4$][BF$_4$]$_2$,
[Pd(C$_6$H$_5$CN)$_4$][SbF$_6$]$_2$

These catalyst components are used in an amount of the following range.

Specifically, the transition metal compounds such as a nickel compound, cobalt compound, and palladium compound are used in the amount of 0.02–100 mm mol for one mol of the monomers, the organoaluminum compounds are used in the amount of 1–5000 mol for one mol atom of the transition metal compounds, and the non-conjugated dienes, Lewis acids, and ionic boron compounds are used in the amount of 0.2–100 mol for one mol atom of nickel or cobalt.

The cyclic olefin copolymer of the present invention can be obtained by copolymerizing the monomers using a multi-component or single component catalyst selected from the above catalysts 1) and 2) and, optionally, 3) in one or more solvents selected from the group consisting of an alicyclic hydrocarbon solvent such as cyclohexane, cyclopentane, and methylcyclopentane, an aliphatic hydrocarbon solvent such as hexane, heptane, and octane, an aromatic hydrocarbon solvent such as toluene, benzene, xylene, and mesitylene, and a halogenated hydrocarbon solvent such as dichloromethane, 1,2-dichloroethylene, 1,1-dichloroethylene, tetrachloroethylene, chlorobenzene, and dichlorobenzene.

A method of preparing an addition copolymer of cyclic olefins having an alkoxysilyl functional group of the present invention is outlined in the following description, which should not be construed as a limitation to the present invention.

A reaction vessel is charged with a solvent, cyclic olefin monomers, and a molecular weight modifier in a nitrogen or argon atmosphere. The polymerization reaction system is set in a temperature range of −20° C. to 100° C.

Next, a catalyst is added and the polymerization is carried out at a temperature of −20° C. to 100° C. The weight ratio of the solvent and monomers is in the range of 1–20. The molecular weight of the target copolymer is controlled by adjusting the amount of polymerization catalyst, the amount of molecular weight modifier such as an α-olefin, hydrogen, or diphenyldihydrosilane, a conversion rate, and polymerization temperature. The polymerization reaction is terminated by the addition of a compound selected from water, an alcohol, an organic acid, and carbon dioxide. The catalyst residue is separated and removed from the polymer solution by adding a mixture of an acid, such as maleic acid, fumaric acid, or oxalic acid, and water or alcohol. The polymer can be obtained by putting the polymer solution into an alcohol such as methanol, ethanol, or i-propanol, and by drying the coagulated polymer under reduced pressure. Unreacted monomers remaining in the polymer solution can also be removed by this procedure.

The polystyrene-reduced number average molecular weight (hereinafter referred to as "Mn") of the cyclic olefin addition copolymer having an alkoxysilyl functional group of the present invention measured by the gel permeation chromatography using an o-dichlorobenzene solvent is preferably in the range from 10,000 to 1,000,000, and more preferably from 50,000 to 500,000. The polystyrene-reduced weight average molecular weight (hereinafter referred to as "Mw") of the polymer is preferably in the range of 15,000 to 1,500,000, and preferably in the range of 70,000–700,000. If the Mn is less than 10,000 or the Mw is less than 15,000, breaking strength may become insufficient. On the other hand, if the Mn is more than 1,000,000 or the Mw is more than 1,500,000, the viscosity of the polymer solution increases, resulting in difficulty in obtaining a flat and smooth sheet or film without waving or warping when producing a sheet or film by cast forming using a solution of the cyclic olefin copolymer.

The glass transition temperature of the cyclic olefin addition copolymer having an alkoxysilyl functional group thus obtained is preferably 200° C. or higher, and preferably 250–400° C. If the glass transition temperature is less than 200° C., heating during cross-linking operation may cause deformation of the formed product.

The cyclic olefin addition copolymer having an alkoxysilyl functional group of the present invention comprises at least one compound selected from the following compounds (A), (B), and (C). These compounds catalyze to form siloxane bonds through which the cyclic olefin addition copolymer is cross-linked.

(A) A compound acting as an acid when heated to 50° C. or higher.

(B) A metal compound of an alkoxy compound, aryloxy compound, carboxyl compound, β-diketonato compound, halogen compound, or oxide, wherein the metal is selected from the group consisting of Al, Ga, Sn, Ca, Ba, Zn, Sb, Ti, Zr, Sc, Y, Ce, Nd, Sm, and Yb.

(C) A compound selected from the group consisting of an organic carboxylic acid, organic phosphoric acid, organic sulfonic acid, ammonia, primary to tertiary amine compound, and quaternary ammonium hydroxide compound.

As compound (A), at least one compound selected from a compound generating an acid by thermal decomposition or a compound generating an acid by hydrolysis in the presence of hot water or steam can be used. The thermal decomposition or hydrolysis occurs at 50–300° C., preferably 80–250° C., and still more 100–200° C. When the composition of the present invention is cross-linked using the compound (A), the composition must be cross-linked at a temperature above which thermal decomposition or hydrolysis of the compound (A) occurs.

The specific examples of the compound (A) will now be described, which should not be construed as limiting the present invention.

As examples of a compound producing an acid by thermal decomposition, a benzyl sulfonium salt, benzyl ammonium salt, benzyl phosphonium salt, hydradinium salt, and the like can be given.

On the other hand, as a compound producing an acid by hydrolysis, a phosphorous acid ester, hypophosphorous acid ester, iminophosphonate, organic carboxylic acid ester, organic sulfonate, organic sulfinic acid, and the like can be given.

An ester of phosphorous acid or hypophosphorous acid can be obtained by reacting an organic compound having a hydroxyl group and phosphorous acid or hypophosphorous acid. As an organic compound having a hydroxyl group to be reacted with phosphorous acid or hypophosphorous acid, an alcohol obtained by replacing one or more hydrogen atoms in a saturated or unsaturated aliphatic hydrocarbon having 1–40 carbon atoms by hydroxyl groups, an alcohol obtained by replacing one or more hydrogen atoms in a saturated or unsaturated alicyclic hydrocarbon having 5–40 carbon atoms by hydroxyl groups, a phenol obtained by replacing one or more hydrogen atoms in an alkyl-substituted or unsubstituted aromatic hydrocarbon having 6–40 carbon atoms by hydroxyl groups, and the like can be given.

The specific examples of the phosphorous acid ester formed by the reaction of these organic compounds having hydroxyl groups and phosphorous acid include: phosphorous acid triesters such as trimethyl phosphite, triethyl phosphite, tripropyl phosphite, tributyl phosphite, trihexyl phosphite, trioctyl phosphite, tridecyl phosphite, triphenyl phosphite, trinonylphenyl phosphite, tristearyl phosphite, diphenyloctyl phosphite, diphenyldecyl phosphite, phenyldidecyl phosphite, (tetraphenyl)dipropylene glycol diphosphite, (tetraphenyl)tetra(tridecyl)pentaerythritol tetraphosphite, tetra(tridecyl)-4,4'-isopropylidenediphenyl diphosphite, bis(2,6-di-t-butyl-4-methylphenyl) pentaerythritol diphosphite, bis(2,4-di-t-butylphenyl) pentaerythritol diphosphite, bis(2,4-di-t-cumylphenyl) pentaerythritol diphosphite, bis(2,6-di-t-cumylphenyl) pentaerythritol diphosphite, distearylpentaerythritol diphosphite, 2,2-methylenebis(4,6-di-t-butylphenyl)octyl phosphite, tri(nonylphenyl)phosphite, tris(dinonylphenyl) phosphite, 1,1,3-tris(2-methyl-4-ditridecylphosphite-5-t-butylphenyl)butane, bis(tridecyl)pentaerythritol tetraphosphite, bis(nonylphenyl)pentaerythritol tetraphosphite, distearylpentaerythritol diphosphite, bis(2,6-di-t-butyl-4-methoxycarbonylethylphenyl)-pentaerythritol diphosphite, and bis(2,6-di-t-butyl-4-octadecyloxycarbonylethylphenyl)-pentaerythritol diphosphite; phosphorous acid diesters such as dimethyl phosphite, diethyl phosphite, dipropyl phosphite, dibutyl phosphite, dihexyl phosphite, dioctyl phosphite, didecyl phosphite, dilauryl phosphite, dioleyl phosphite, diphenyl phosphite, phenyloctyl phosphite, and phenyldecyl phosphite; and phosphorous acid monoesters such as methyl phosphite, ethyl phosphite, propyl phosphite, butyl phosphite, hexyl phosphite, octyl phosphite, decyl phosphite, and phenyl phosphite.

Specific examples of the hypophosphorous acid ester formed by the reaction of these organic compounds having hydroxyl groups and hypophosphorous acid include: hypophosphorous acid diesters such as dimethylphenyl phosphonite, diethylphenyl phosphonite, dipropylphenyl phosphonite, dibutylphenyl phosphonite, dihexylphenyl phosphonite, dioctylphenyl phosphonite, didecylphenyl phosphonite, methyldiphenyl phosphonite, ethyldiphenyl phosphonite, propyldiphenyl phosphonite, butyldiphenyl phosphonite, hexyldiphenyl phosphonite, octyldiphenyl phosphonite, decyldiphenyl phosphonite, bis[bis(2,4-di-t-butyl-5-methylphenoxy)phosphino]biphenyl, and bis[bis(2,4-di-t-butylphenoxy)phosphino]biphenyl; hypophosphorous acid monesters such as methylphenyl phosphinate, ethylphenyl phosphinate, propylphenyl phosphinate, butylphenyl phosphinate, hexylphenyl phosphinate, octylphenyl phosphinate, and decylphenyl phosphinate.

The following compounds can be given as examples of the other compounds producing an acid by hydrolysis: organic carboxylic acid esters such as propyl acetate, butyl acetate, amyl acetate, propyl propionate, butyl propionate, amyl propionate, propyl 2-ethylhexanoate, butyl 2-ethylhexanoate, and amyl 2-ethylhexanoate; organic sulfonic acid esters such as ethyl p-toluenesulfonate, propyl p-toluenesulfonate, butyl p-toluenesulfonate, amyl p-toluenesulfonate, ethyl decanesulfonate, propyl decanesulfonate, butyl decanesulfonate, and amyl decanesulfonate; organic sulfinic acid esters such as ethyl p-toluenesulfinate, propyl p-toluenesulfinate, butyl p-toluenesulfinate, amyl p-toluenesulfinate, ethyl decanesulfinate, propyl decanesulfinate, butyl decanesulfinate, and amyl decanesulfinate; and iminosulfonates such as 2,3,4-trihydronaphthyl-1-imino-N-phenylsulfonate, and the like.

Among these, phosphorous acid esters and hypophosphorous acid esters are preferable from the viewpoint of excellent storage stability of the composition. Among the phosphorous acid esters and hypophosphorous acid esters, phosphorous acid esters are more preferable because of both the high catalytic activity and excellent storage stability of the composition.

These cross-linking catalysts acting as an acid by hydrolysis are used in the amount of 0.001–10 parts by weight, preferably 0.01–5.0 parts by weight, and still more preferably 0.05–2.0 parts by weight for 100 parts by weight of the cyclic olefin addition copolymer having an alkoxysilyl functional group in the composition. If the amount of the cross-linking catalyst is less than 0.001 part by weight, the catalytic effect is insufficient; if more than 10 parts by weight, on the other hand, problems such as a decrease in the transparency of resulting cross-linking product, an increase in the amount of the volatile components during heating, and the like may occur.

The specific examples of the compound (B) will now be described, which should not be construed as limiting the present invention.

Specific examples of aluminum compounds include: organoaluminum compounds such as tri-i-propoxy aluminum, di-i-propoxy.ethylacetoacetate aluminum, di-i-propoxy.acetylacetonate aluminum, i-propoxy.bis (ethylacetoacetate)aluminum, i-propoxy.bis (acetylacetonate)aluminum, tris(ethylacetoacetate) aluminum, tris(acetylacetonate)aluminum, and mono-acetylacetonate.bis(ethylacetoacetate)aluminum;

Specific examples of gallium compounds include tris (acetylacetonate)gallium, tri-i-propoxy gallium, di-i-propoxy.acetylacetonate gallium, and i-propoxy.bis (ethylacetoacetate) gallium.

Specific examples of tin compounds will be described later.

Specific examples of calcium compounds include calcium acetate and calcium octanoate.

Specific examples of barium compounds include barium acetate and barium octanoate.

Specific examples of zinc compounds include zinc acetate and zinc octanoate.

Specific examples of antimony compounds include antimony acetate and antimony ethylene glycoxide.

Specific examples of titanium compounds include tetra-i-propoxy titanium, di-i-propoxy.bis(ethylacetoacetate) titanium, di-i-propoxy.bis(acetylacetate)titanium, and di-i-propoxy.bis(acetylacetone)titanium.

Specific examples of zirconium compounds include organic zirconium compounds such as tetra-n-butoxy zirconium, tri-n-butoxy.ethylacetoacetate zirconium, di-n-butoxy.bis(ethylacetoacetate)zirconium, n-butoxy.tris (ethylacetoacetate)zirconium, tetrakis(n-propylacetoacetate) zirconium, tetrakis(acetylacetoacetate)zirconium, and tetrakis(ethylacetoacetate)zirconium.

A specific example of scandium compound is scandium tri-i-propoxide.

Specific examples of yttrium compounds are yttrium tri-i-propoxide and yttrium tris (aluminumtetra-i-propoxide)

Specific examples of lanthanide compounds include iso-propoxide compounds and butoxide compounds of Gd, Nd, Sm, or Yb.

Of the above compounds, at least one compound selected from the tin compounds shown by the following formulas (3), (4), and (5) is preferable.

$$Sn(R^7)_2 \qquad (3)$$

wherein $R^7$ represents a carboxyl group having 1–20 carbon atoms, β-diketone group, alkoxyl group having 1–15 carbon atoms, phenoxy group, or halogen atom.

$$Sn(R^8)_{4-n}(R^7)_n \qquad (4)$$

wherein $R^7$ is the same as defined in formula (3), $R^8$ represents a hydrocarbon group having 1–15 carbon atoms or a halogen atom, and n is in integer of 0–4.

$$(R^8)_2Sn=O \text{ or } (R^8)_2(Y)-Sn-O-Sn(R^8)_2(X) \qquad (5)$$

wherein $R^8$ is the same as defined for the formula (4), X and Y individually indicate a hydroxyl group, halogen atom, or isothiocyanate group.

Specific examples of such a tin compound are as follows.

Tin compounds shown by the formula (1): tin(II)diacetate, tin(II)dipropionate, tin(II)maleate, tin(II)fumarate, tin(II) dioctanoate, tin(II)decanoate, tin(II)didodecanoate, tin(II) dilaurate, tin(II)dioleate, tin(II)diversaticate, tin(II) naphthoate, tin(II)bisacetylacetonate, tin(II)bis-ethylacetoacetate, tin(II)bis-butylacetoacetate, tin(II) dimethoxide, tin(II)diethoxide, tin(II)dipropoxide, tin(II) dibutoxide, tin(II)diamyloxide, tin(II)diphenoxide, tin(II)bis (2,6-di-tert-butylphenoxide), tin(II)dinonylphenoxide, tin (II)dichloride, tin(II)dibromide, and tin(II)dichloride dihydride.

Tin compounds shown by the formula (2): dibutyltin(IV) dilaurate, dibutyltin(IV)dioleate, dibutyltin(IV)dioctoate, dibutyltin(IV)distearate, dihexyltin(IV)dilaurate, dihexyltin (IV)dioleate, dioctyltin(IV)dilaurate, dioctyltin(IV)dioleate, dioctyltin(IV)diversaticate, dibutyltin(IV)maleate, dibutyltin(IV)fumarate, dioctyltin(IV)maleate, dioctyltin (IV)acetylacetonate, dibutyltin(IV)acetylacetonate, dioctyltin(IV)ethylacetoacetate, dibutyltin(IV)dichloride, dioctyltin(IV)dichloride, dioctyltin(IV)dibromide, tin(IV) tetrachloride, dibutyltin(IV)dibutoxide, dibutyltin(IV) dipropoxide, dibutyltin(IV)diethoxide, dioctyltin(IV) diethoxide, dibutyltin(IV)diphenoxide, dibutyltin(IV) dinonylphenoxide, tributyltin(IV)chloride, tributyltin(IV) methoxide, tributyltin(IV)ethoxide, tributyltin(IV)butoxide, tributyltin(IV)acetate, tributyltin(IV)octoate, trioctyltin(IV) chloride, and trioctyltin(IV)acetate.

Tin compounds shown by the formula (3): diethyltin oxide, dibutyltin oxide, dioctyltin oxide, dinonyltin oxide, 1-hydroxy-3-chloro-1,1,3,3-tetrabutyl-distanoxane, 1-hydroxy-3-chloro-1,1,3,3-tetramethyl-distanoxane, 1-hydroxy-3-chloro-1,1,3,3-tetraethyl-distanoxane, 1-hydroxy-3-i-thiocyanato-1,1,3,3-tetrabutyl-distanoxane, 1-hydroxy-3-chloro-1,1,3,3-tetraoctyl-distanoxane, and 1,3-bis(isocyanate)-1,1,3,3-tetrabutyl-distanoxane.

These tin compounds are used in the amount of 0.001–5 parts by weight, preferably 0.005–1.0 parts by weight, and still more preferably 0.01–0.1 parts by weight for 100 parts by weight of the cyclic olefin addition copolymer having an alkoxysilyl functional group in the composition. If the amount of the tin compounds is less than 0.001 part by weight, the catalytic effect is insufficient; if more than 5 parts by weight, on the other hand, storage stability of the composition may be impaired.

Cross-linking of the composition of the present invention is carried out using these tin compounds in a solid state under high humidity conditions, in a solution containing water, in a suspension or emulsion of polymer containing a dispersant or emulsifier. The cross-linking may remain insufficient if a sufficient amount of water is not supplied for the amount of alkoxysilane in the cyclic olefin addition copolymer having an alkoxysilyl functional group in the composition.

The cross-linking is carried out usually at 0–300° C., preferably 50–200° C., from 1 minute to 1,000 hours. Optimum temperature and reaction time, however, are determined according to the degree of cross-linking, the conditions of the reaction system, the type of polymer, the polymer concentration in the solution, and the type of catalyst.

When using the divalent tin compound of the formula (3), the cross-linking reaction is accelerated and the small amount of tin compound used can be decreased, if an alcohol such as methanol, ethanol, propanol, butanol, octanol, or benzyl alcohol or a lactic acid derivative having a hydroxyl functional group such as L-lactide, D,L-methyl lactate, D,L-ethyl lactate, D,L-butyl lactate, or D,L-octyl lactate is used in combination. Such an alcohol or lactic acid derivative may be added in an amount of 0.1–500 mol for one mol of the divalent tin compound of the formula (3).

The specific examples of the compound (C) will now be described, which should not be construed as limiting the present invention.

Organic carboxylic acid such as formic acid, oxalic acid, acetic acid, hexanoic acid, octanoic acid, lactic acid, stearic acid, oleic acid, maleic acid, and fumaric acid; organic phosphoric acid such as dioctyl phosphate, dibutyl phosphate, mono or di-phosphate of lauroxy polyethylene glycol, dibutyl monophosphate, dibutyl diphosphate, dioctyl monophosphate; organic sulfonic acid such as dodecylbenzenesulfonic acid and nonylbenzenesulfonic acid; primary, secondary, or tertiary amine compounds such as methylamine, ethylamine, butylamine, octylamine, ethylenediamine, diethylamine, dibutylamine, pyridine, triethylenediamine, tetramethyl ethylenediamine, and cyclohexylamine; and quaternary ammonium hydroxide compounds such as tetramethylammonium hydroxide, tetrabutylammonium hydroxide, and tetraoctylammonium hydroxide.

These compounds (A)–(C) can be used either individually or in combination of two or more. The use in combination of two or more herein used includes the use of two or more compounds from the same class, for example, from the compound (A), as well as from different classes, for example, from the compound (A) and compound (B).

Cross-linking products may become turbid when the composition includes later-discussed organosilane, hydrolyzate or condensate of organosilane, or fine particles of metal oxide such as silica, alumina, zirconia, titania, diatomite, montmorillonite, and tin oxide. The combined use of the compound (A) and compound (B) is effective to overcome this problem and manufacture the cross-linked material having excellent transparency with good reproducibility.

Although details of the reaction mechanism are still to be clarified, it is presumed that the catalytic action of the compound (B) improves dispersion of the alkoxysilane or metal oxide particles in the cyclic olefin addition copolymer by grafting these components with the copolymer, whereas the catalytic action of the compound (A) cross-links molecules of modified cyclic olefin addition copolymer. As a result, a highly transparent cross-linked material can be easily manufactured.

To increase the degree of cross-linking, heat resistance, and dimensional stability of the cross-linked material of the present invention, at least one component selected from an organosilane shown by the following formula (6) (hereinafter referred to as "organosilane (1)"), hydrolyzate of organosilane (1), and condensate of organosilane (1) can be added to the composition of the cyclic olefin addition copolymer having an alkoxysilyl functional group.

$$(R^9)_q Si(OR^{10})_{4-q} \qquad (6)$$

wherein $R^9$ individually, when two or more are present, represents an organic group having 1–10 carbon atoms, $R^{10}$ individually represents an alkyl group having 1–5 carbon atoms or an acyl group having 1–6 carbon atoms, and q is an integer from 0–2.

In the present invention, the hydrolyzate of organosilane (1) is not restricted to a compound in which all of the $OR^{10}$ groups in the compound are hydrolyzed, but includes compounds in which one, two, or more $OR^{10}$ groups are hydrolyzed, and a mixture of these compounds.

In the same manner, the condensate of organosilane (1), which means a compound in which Si—O—Si bonds are formed by condensation of silanol groups on the hydrolyzed organosilane, is not restricted to mean in which all silanol groups are condensed, but includes a compound in which only a small amount of silanol groups are condensed, as well as a mixture of compounds with a different degree of condensation.

In the above formula (6), the carbon atom content of the group $R^9$ is 1–10, and preferably 1–8. As examples of the univalent organic group represented by $R^9$, an alkyl group such as a methyl group, ethyl group, n-propyl group, i-propyl group, n-butyl group, i-butyl group, sec-butyl group, t-butyl group, n-hexyl group, n-heptyl group, n-octyl group, and 2-ethylhexyl group; an acyl group such as an acetyl group, propionyl group, butyryl group, valeryl group, benzoyl group, trioyl group, and caproyl group; vinyl group, phenyl group, glycidyl group, (meth)acryloxy group, ureido group, amide group, fluoro acetamide group, and isocyanate group, as well as substitution derivatives of these groups can be given.

As examples of the substituents on the group $R^9$, a halogen atom, substituted or unsubstituted amino group, mercapto group, isocyanate group, glycidoxy group, 3,4-epoxycyclohexyl group, (meth)acryloxy group, ureido group, and ammonium salt can be given. The number of the carbon atom in the group $R^9$ containing these substitutions is 20 or less.

When two or more groups $R^9$ are contained in the compound of formula (6), such groups may be either identical or different.

As examples of an alkyl group of $R^{10}$, having 1–5 carbon atoms, a methyl group, ethyl group, n-propyl group, i-propyl group, n-butyl group, i-butyl group, sec-butyl group, t-butyl group, n-pentyl group, and the like can be given. As examples of an acyl group having 1–6 carbon atoms, an acetyl group, propionyl group, butyryl group, valeryl group, and caproyl group can be given.

The following compounds can be given as specific examples of the organosilane (1): tetra-alkoxysilanes such as tetramethoxysilane, tetraethoxysilane, tetra-n-propoxysilane, tetra-i-propoxysilane, and tetra-n-butoxysilane; trialkoxysilanes such as methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, n-butyltrimethoxysilane, n-butyltriethoxysilane, n-pentyltrimethoxysilane, n-hexyltrimethoxysilane, n-heptyltrimethoxysilane, n-octyltrimethoxysilane, vinyltrimethoxysilane, vinyltriethoxysilane, cyclohexyltrimethoxysilane, cyclohexyltriethoxysilane, phenyltrimethoxysilane, phenyltriethoxysilane, 3-chloropropyltrimethoxysilane, 3-chloropropyltriethoxysilane, 3,3,3-trifluoropropyltrimethoxysilane, 3,3,3-trifluoropropyltriethoxysilane, 3-aminopropyltrimethoxysilane, 3-aminopropyltriethoxysilane, 2-hydroxyethyltrimethoxysilane, 2-hydroxyethyltriethoxysilane, 2-hydroxypropyltrimethoxysilane, 2-hydroxypropyltriethoxysilane, 3-hydroxypropyltrimethoxysilane, 3-hydroxypropyltriethoxysilane, 3-mercaptopropyltrimethoxysiane, 3-mercaptopropyltriethoxysilane, 3-isocyanatepropyltrimethoxysilane, 3-isocyanatepropyltriethoxysilane, 3-glycidoxypropyltrimethoxysilane, 3-glycidoxypropyltriethoxysilane, 2-(3,4-epoxycyclohexyl) ethyltrimethoxysilane, 2-(3,4-epoxycyclohexyl) ethyltriethoxysilane, 3-(meth)acryloxypropyltrimethoxysilane, 3-(meth)acryloxypropyltriethoxysilane, 3-ureidopropyltrimethoxysilane, and 3-ureidopropyltriethoxysilane; dialkoxysilanes such as dimethyldimethoxysilane, dimethyldiethoxysilane, diethyldimethoxysilane, diethyldiethoxysilane, di-n-propyldimethoxysilane, di-n-propyldiethoxysilane, di-i-propyldimethoxysilane, di-i-propyldiethoxysilane, di-n-butyldimethoxysilane, di-n-butyldiethoxysilane, di-n-pentyldimethoxysilane, di-n-pentyldiethoxysilane, di-n-hexyldimethoxysilane, di-n-hexyldiethoxysilane, di-n-heptyldimethoxysilane, di-n-heptyldiethoxysilane, di-n-octyldimethoxysilane, di-n-octyldiethoxysilane, di-n-cyclohexyldimethoxysilane, di-n-cyclohexyldiethoxysilane, diphenyldimethoxysilane, and diphenyldiethoxysilane; methyltriacetyloxysilane, and dimethyldiacetyloxysilane.

Of these organosilanes, tetramethoxysilane and tetraethoxysilane are preferable as tetraalkoxysilanes, methyltrimethoxysilane and methyltriethoxysilane are preferable as trialkoxysilanes, and dimethyldimethoxysilane and dimethyldiethoxysilane are preferable as dialkoxysilanes.

In the present invention, a particularly preferable manner of use of organosilanes is the single use of tetraalkoxysilanes, trialkoxysilanes, or dialkoxysilanes, or a combinatorial use of 10–90 mol % of tetraalkoxysilanes, 10–90 mol % of trialkoxysilanes, and 10–90 mol % of dialkoxysilanes. A cross-linked material having a small coefficient of linear expansion, or exhibiting excellent dimensional stability, can be obtained by introducing these alkoxysilanes. Adhesion can also be improved.

The organosilane is used as is, as a hydrolyzate and/or condensate.

The hydrolyzate and condensate can be obtained not only by hydrolysis or condensation of the organosilane (1), but also by hydrolysis or condensation of a chlorosilane compound such as a methyltrichlorosilane, ethyltrichlorosilane, phenyltrichlorosilane, dimethyldichlorosilane, diethyldichlorosilane, or diphenyldichlorosilane.

When the organosilane (1) is used as a hydrolzate and/or condensate, the Mw of the condensate is preferably 800–100,000, and still more preferably 1,000–50,000.

The hydrolzate/condensate of organosilane (1) is commercially available as MKC silicate manufactured by Mitsubishi Chemical Corp., ethyl silicate manufactured by Colcoat Co., Ltd., a silicone resin manufactured by Toray-Dow Corning Co., Ltd., a silicone resin manufactured by Shin-Etsu Chemical Co., Ltd., a hydroxyl group-containing polydimethylsiloxane manufactured by Dow Corning Asia Co., and a silicon oligomer manufactured by Nippon Unica Co., Ltd. These are used as is or after condensation.

These compounds of organosilane (1) are added to the composition of the present invention in an amount of 2–70 parts by weight, and preferably 5–50 parts by weight for 100 parts by weight of the cyclic olefin copolymer. If the amount of the compounds added is less than 2 parts by weight, the film or sheet produced from the composition exhibits only slight improvement in solvent resistance and dimensional stability. If more than 70 parts by weight, transparency may be impaired.

When the organosilane (1) forms inorganic particles by hydrolysis/condensation and, if the particle size of the inorganic particles is 100 μm or less, and preferable 10 μm or less, such inorganic particles disperse in the polymer, thereby producing a composition which is optically transparent and exhibits superior heat resistance and dimensional stability.

To increase the degree of cross-linking and heat resistance of the cross-linked material of the present invention, at least one metal oxide selected from silica, alumina, zirconia, titanium dioxide, diatomite, montmorillonite, and tin oxide can be added to the composition of the cyclic olefin addition copolymer having an alkoxysilyl functional group.

These metal oxide particles are added to the composition of the present invention in an amount of 2–70 parts by weight, and preferably 5–50 parts by weight for 100 parts by weight of the cyclic olefin copolymer having an alkoxysilyl functional group. If this amount is less than 2 parts by weight, the cross-linked material exhibits only slight improvement in solvent resistance and dimensional stability. If more than 70 parts by weight, transparency may be impaired.

The particle diameter of the metal oxide particles is preferably not greater than 100 nm, and still more preferably not greater than 10 nm. The above particle diameter ensures production of optically transparent cross-linked material with excellent heat resistance and dimensional stability.

The formed articles can be prepared from the composition of the cyclic olefin addition copolymer having an alkoxysilyl functional group of the present invention by a casting method. Specifically, a film, sheet, or coating film can be formed by casting the solution of the composition, removing the solvent, and drying the coating. Although the solvents used as the cast solvent cannot be generically specified because the solubility of the cyclic olefin addition copolymer having an alkoxysilyl functional group varies according to the type of the copolymer, one or more solvents may be selected from hydrocarbon compounds, halogenated hydrocarbon compounds, ethers, esters, ketones, amines, amides, alcohols, phenols, and sulfoxides. The amount of solvents used is from 1 to 10,000 parts by weight, and preferably from 10 to 5,000 parts by weight, for 100 parts by weight of the copolymer.

The cross-linking can be completed by heating the formed article at 50° C. or more, optionally by causing water or steam at 50° C. or more to come contact with the formed article.

Appropriate cross-linking reaction conditions can be selected according to the target degree of cross-linking, the state of reaction system, the type of polymer, and the type and amount of catalyst.

The content of toluene soluble components in the cross-linked material of the present invention is preferably not more than 10 wt %. Moreover, the degree of swelling of the cross-linked material determined in toluene at 25° C. is preferably not more than 300%.

If the content of toluene soluble components is more than 10 wt % or the degree of swelling is more than 300%, the cross-linked material will not have chemical resistance, solvent resistance, and dimensional stability during heating sufficient for use as a glass substitute. The degree of swelling here is a value determined by the method described later. The degree of swelling of the cross-linked material can be easily adjusted by the amount of the cross-linking catalyst, the reaction temperature, and reaction time.

Furthermore, the coefficient of linear expansion of the cross-linked material determined at 80° C. is preferably not more than 70 ppm/°C. If the coefficient of linear expansion determined at 80° C. is more than 70 ppm/°C., heat deformation of the cross-linked material during post-processing or during use at a high temperature is so great that the product after processing may be defective or problems may occur in the articles in which the cross-linked material is used.

A phenol-type or hydroquinone-type antioxidant such as 2,6-di-t-butyl-4-methylphenol, 4,4'-thiobis(3-methyl-6-t-butylphenol), 1,1'-bis(4-hydroxyphenyl)cyclohexane, 2,2'-methylenebis(4-methyl-6-t-butyl-6-butylphenol), 2,5-di-t-butylhydroquinone, and pentaerythrityl-tetrakis-[3-(3,5-di-t-butyl-4-hydroxyphenyl)propionate] may be added to the composition of cyclic olefin addition copolymer having an alkoxysilyl functional group or the cross-linked product thereof of the present invention to increase the oxidation stability.

Because of excellent optical transparency, heat resistance, adhesion, and anti-hygroscopic properties, the composition of cyclic olefin addition copolymer having an alkoxysilyl functional group of the present invention can be suitably used as a material for electronic parts such as a photoconductive board, polarization film, liquid crystal panel, phase shift film, transparent conductive film, OHP film, optical disk, optical fiber, and lens, and as an adhesive and a coating material.

The cross-linked product made from the composition of the cyclic olefin addition copolymer having an alkoxysilyl functional group of the present invention can be suitably used for a substrate for liquid crystal display apparatus as a glass substitute. This material satisfies various characteristics such as heat resistance, washing solution resistance, transparency, adhesiveness, dimensional stability, and liquid crystal resistance during injection of liquid crystal, required for the substrate material in the processes of exposure, development and etching when a TFT (membrane transistor) is formed on the liquid crystal substrate.

EXAMPLES

The present invention will be described in more detail by way of examples, which should not be construed as limiting the present invention.

The molecular weight, degree of swelling, glass transition temperature, liquid crystal resistance, total light transmission, and solution viscosity were determined by the following methods.

(1) Weight Average Molecular Weight and Number Average Molecular Weight

The molecular weight was determined by gel permeation chromatography (GPC) using a GPC apparatus Type-150C manufactured by Waters Co., the H-type column manufactured by Tosoh Corp., and o-dichlorobenzene as a solvent at 120° C. The molecular weight determined is indicated by a standard polystyrene-reduced value.

(2) Residual Metal

The residual metal in copolymers was determined by measuring the atomic absorption using a Z-9000 atomic spectrophotometer manufactured by Hitachi, Ltd. and applying the measured value to a calibration curve prepared using nickel and aluminum standard solutions (Wako Pure Chemical Co., Ltd.)

(3) Degree of Swelling in Toluene

A 2 cm×2 cm film with a thickness of 100 μm was dipped in toluene for 3 hours at 25° C. The degree of swelling was determined from the ratio of weight before and after dipping.

A sample exhibiting no swelling is rated to have a degree of non-swelling of 100%.

(4) Glass Transition Temperature

Because the glass transition temperature of the cyclic olefin addition copolymer of the present invention cannot always clearly be measured by the differential scanning colorimetric (DSC) method, a peak temperature, Tan δ, which is the ratio of the storage modulus of elasticity (E') and the loss modulus of elasticity E" (E'/E"), determined by the dynamic viscoelasticity measurement was taken as the glass transition temperature.

The dynamic viscoelasticity was measured using Leovibron DDV-01FP (manufactured by Olientech Co., Ltd.) under the conditions of a frequency of 10 Hz, a temperature rise of 4° C./minute, a single waveform vibration mode, and a vibration swing of 2.5 $\mu$m.

(5) Total Light Transmittance

The total light transmittance was measured according to ASTM-D 1003 using a film with a thickness of 100 $\mu$m.

(6) Coefficient of Linear Expansion

A sample (3 cm×10 mm×100 $\mu$m) was secured in a thermal mechanical analyzer (TMA) SS6100 (manufactured by Seiko Instrument Co., Ltd.) at a chuck distance of 10 mm and heated from room temperature to 200° C. to measure the residual stress. Then, after cooling to room temperature, the sample was again heated at a temperature rise of 3° C./minute to determine the coefficient of linear expansion from the elongation of the chuck distance.

(7) Liquid Crystal Resistance

One drop (about 20 mg) of liquid crystal for TFT measurement (ZLI5081, manufactured by Merck Japan Inc.) was dropped on a sample (2 cm×2 cm×50–500 $\mu$m) and heated for one hour at 150° C. under the atmospheric pressure to examine the change on the film surface by the naked eye observation. The evaluation was made based on the following standard.

⊚: No change in the configuration was observed.

○: Slight swelling was observed.

Δ: The sample swelled.

X: The sample was deformed by dissolution or the like.

(8) Adhesiveness and Stickiness

Aluminum was applied to the surface of the test film by vapor deposition. The aluminum surface was cut into 5×5 squares, 1 mm×1 mm each, and subjected to a peeling test using an adhesive cellophane tape to determine the number of peeled squares among 25 squares.

Reference Example 1

Synthesis of Copolymer (a)

A reaction vessel (11) was charged with 593.75 mmol of 2-norbornene, 31.25 mmol of 5-triethoxy-2-norbornene, 500 g of toluene as a solvent, and 0.25 mmol of a molecular weight modifier (1,5-cyclooctadiene). The reaction system was maintained at 10° C. and charged with 0.25 mmol of a nickel compound, which had been previously prepared by reacting a 1:1 (molar ratio) mixture of nickel octoate and hexafluoro antimonite at −15° C., 2.25 mmol of a trifluoroboron-diethyl ether complex, and 2.5 mmol of triethyl aluminum.

After the polymerization for one hour at 30° C., the polymerization reaction was terminated by the addition of isopropyl alcohol. The addition rate to the copolymer was 95%. 6 g of lactic acid was added to the copolymer solution to react with the catalyst component. The copolymer was coagulated by putting the copolymer solution into 41 of iso-propanol, thereby removing unreacted monomers and catalyst residues.

The coagulated copolymer was dried to obtain copolymer (a).

As a result of $^1$H-NMR analysis at 270 MHz (methylene absorption of ethoxy silyl group: 3.7 ppm, solvent: toluene D8, based on TMS), the copolymer (a) was confirmed to contain 5.0 mol % of a structure derived from 5-triethoxysilyl-2-norbornene. The Mn and Mw of the copolymer (a) were respectively 87,000 and 211,000. The amount of residual nickel in the polymer was 0.1 ppm or less, and the residual aluminum was 1.6 ppm.

Reference Example 2

Synthesis of Copolymer (b)

Copolymer (b) was prepared in the same manner as in Reference Example 1, except for using 562.5 mmol of 2-norbornene and 62.5 mmol of 5-triethoxy-2-norbornene as monomers.

As a result of $^1$H-NMR analysis at 270 MHz (methylene absorption of ethoxy silyl group: 3.7 ppm, solvent: toluene D8, based on TMS) the copolymer (b) was confirmed to contain 9.9 mol % of a structure derived from 5-triethoxysilyl-2-norbornene. The Mn and Mw of the copolymer (b) were respectively 88,000 and 223,000. The amount of residual nickel in the polymer was 0.1 ppm or less, and the residual aluminum was 1.2 ppm.

Reference Example 3

Synthesis of Copolymer (c)

Copolymer (c) was prepared in the same manner as in Reference Example 1, except for using 531.23 mmol of 2-norbornene, 62.50 mmol of 5-triethoxy-2-norbornene, and 31.25 mmol of 8-methyl-8-methoxycarbonyl-3-tetracyclo-[4.4.0.1$^{2,5}$1$^{7,10}$]dodecene as monomers.

As a result of $^1$H-NMR analysis at 270 MHz (methylene absorption of ethoxy silyl group: 3.7 ppm, solvent: toluene D8, based on TMS) the copolymer (c) was confirmed to contain 9.9 mol % of a structure derived from 5-triethoxysilyl-2-norbornene. From the calibration curve of the characteristic IR absorption at 1730 cm$^{-1}$, the content of the structure originating from 8-methyl-8-methoxycarbonyl-3-tetracyclo[4.4.0.1$^{2,5}$.1$^{7,10}$]dodecene in the copolymer (c) was confirmed to be 4.9 mol %. The Mn and Mw of the copolymer (c) were respectively 89,000 and 256,000. The amount of residual nickel in the polymer was 0.1 ppm or less, and the residual aluminum was 0.1 ppm or less.

Reference Example 4

Synthesis of Copolymer (d)

Copolymer (d) was prepared in the same manner as in Reference Example 1, except for using 500 mmol of 2-norbornene, 93.75 mmol of 5-n-hexyl-2-norbornene, 62.50 mmol of 5-triethoxy-2-norbornene, and 31.25 mmol of 5-triethoxysilyl-2-norbornene as monomers.

As a result of $^1$H-NMR analysis at 270 MHz (methylene absorption of ethoxy silyl group: 3.7 ppm, solvent: toluene D8, based on TMS) the copolymer (d) was confirmed to contain 4.8 mol % of a structure derived from 5-triethoxysilyl-2-norbornene. From the calibration curve of the characteristic IR absorption at 721 cm$^{-1}$, the content of the structure originating from 5-n-hexyl-2-norbornene in the copolymer (d) was confirmed to be 14.0 mol %. The Mn and Mw of the copolymer (d) were respectively 220,000 and 350,000. The amount of residual nickel in the polymer was 0.1 ppm or less, and the residual aluminum was 1.1 ppm.

The following compounds were used as the compound (A) in the following Examples.

P1: Tributyl phosphite

P2: Bis (2,6-di-t-butyl-4-methylphenyl)pentaeythritol diphosphite

P3: Phenyldidecyl phosphite
P4: Dibutyl phosphite
P5: Ethyl phosphite
P6: Diethylphenyl phosphonite
P7: Ethylphenyl phosphinate,
P8: 2,3,4-Trihydronaphthyl-1-imino-N-phenylsulfonate Example 1
Preparation of a Cross-Linking Film from Copolymer (a) (P was not Added, Only Sn was Added)

10 g of copolymer (a) was dissolved in 40 g of toluene with a water content of 70 ppm and 1.0 part by weight of pentaerythritoltetrakis-[3-(3,5-di-t-butyl-4-hydroxyphenyl) propionate] was added as an antioxidant for 100 parts by weight of the copolymer. After the addition of 0.05 part by weight of tin (II) diloctanate as a cross-linking catalyst, the solution was spread onto a PETRI dish and allowed to stand for three hours at 40° C. under atmospheric pressure, thereby obtaining a film. The film was removed from the PETRI dish and dried for two hours at 150° C. under atmospheric pressure. The film was further dried for one hour at 230° C. under vacuum to obtain a colorless transparent film with a thickness of 100 $\mu$m. The properties of the resulting film are shown in Table 1.

Example 2
Preparation of a Cross-Linking Film from Copolymer (a) (Only P was Added, Steam Cross-linking)

10 g of copolymer (a) was dissolved in 40 g of toluene with a water content of 70 ppm and 1.0 part by weight of pentaerythritoltetrakis-[3-(3,5-di-t-butyl-4-hydroxyphenyl) propionate] was added as an antioxidant for 100 parts by weight of the copolymer. After the addition of 0.5 part by weight of tributyl phosphite as a cross-linking catalyst, the solution was spread onto a PETRI dish and allowed to stand for three hours at 40° C. under atmospheric pressure, thereby obtaining a film. The film was removed from the PETRI dish, dried for two hours at 150° C. under atmospheric pressure, and treated with steam at 150° C. for four hours. The film was further dried for one hour at 230° C. under vacuum to obtain a colorless transparent film with a thickness of 100 $\mu$m. The properties of the resulting film are shown in Table 1.

Examples 3–9
Preparation of a Cross-Linking Film from Copolymer (a) (Only P was Added, Steam Cross-Linking)

Films were prepared in same manner as in Example 3, except that P2 to P8 were used instead of tributyl phosphite (P1). The properties of the resulting films are shown in Table 1.

Example 10

10 g of copolymer (a) was dissolved in 40 g of toluene with a water content of 70 ppm and 1.0 part by weight of pentaerythritoltetrakis [3-(3,5-di-t-butyl-4-hydroxyphenyl) propionate] was added as an antioxidant for 100 parts by weight of the copolymer. After the addition of 0.5 part by weight of p-methoxybenzylsulfonium-SbF$_6$ as a cross-linking catalyst, the solution was spread onto a PETRI dish and allowed to stand for three hours at 40° C. under atmospheric pressure, thereby obtaining a film. The film was removed from the PETRI dish, heated for two hours at 150° C. under atmospheric pressure, and dried for one hour at 230° C. under vacuum to obtain a colorless transparent film with a thickness of 100 $\mu$m. The properties of the resulting film are shown in Table 1.

Example 11

10 g of copolymer (a) was dissolved in 40 g of toluene with a water content of 70 ppm and 1.0 part by weight of pentaerythritoltetrakis-[3-(3,5-di-t-butyl-4-hydroxyphenyl) propionate] was added as an antioxidant for 100 parts by weight of the copolymer. After the addition of 0.5 part by weight of dioctyl phosphate as a cross-linking catalyst, the solution was spread onto a PETRI dish and allowed to stand for three hours at 40° C. under atmospheric pressure, thereby obtaining a film. The film was removed from the PETRI dish, heated for two hours at 150° C. under atmospheric pressure, and dried for one hour at 230° C. under vacuum to obtain a colorless transparent film with a thickness of 100 $\mu$m. The properties of the resulting film are shown in Table 1.

Example 12
Preparation of a Cross-Linking Film from Copolymer (a) (Both P and Sn were Added)

A cross-linking film was prepared in the same manner as in Example 2 except for using a solution prepared by adding tin(II)diloctanate to the casting solution prepared in Examples 2. The properties of the resulting film are shown in Table 1.

Example 13
Preparation of a Cross-Linking Film from Copolymer (a) and TEOS (P was not Added, only Sn was Added)

A cross-linking film was prepared in the same manner as in Example 1 except for using a solution prepared by adding 2 g of tetraethoxy silane (TEOS) was added to the solution prepared in Examples 1. The properties of the resulting film are shown in Table 1.

Example 14
Preparation of a Cross-Linking Film from Copolymer (a) and TEOS (Only P was Added)

A cross-linking film was prepared in the same manner as in Example 2 except for using a solution prepared by adding 2 g of tetraethoxy silane (TEOS) was added to the solution prepared in Examples 2. The film was slightly turbid, with a total light transmission of 85%. The properties of the resulting film are shown in Table 1.

Example 15
Preparation of a Cross-Linking Film from Copolymer (a) and TEOS (Both P and Sn were Added)

A cross-linking film was prepared in the same manner as in Example 2 except for using a solution prepared by adding 2 g of tetraethoxy silane (TEOS) and 0.05 part by weight of tin(II) diloctanate were added to the solution prepared in Examples 2. The properties of the resulting film are shown in Table 1.

Example 16
Preparation of a Cross-Linking Film from Copolymer (b) and TEOS (Both P and Sn were Added)

A film was prepared in same manner as in Example 6, except that copolymer (b) was used instead of copolymer (a). The properties of the resulting film are shown in Table 1.

Example 17
Preparation of a Cross-Linking Film from Copolymer (c) and TEOS (Both P and Sn were Added)

A film was prepared in same manner as in Example 6, except that copolymer (c) was used instead of copolymer (a). The properties of the resulting film are shown in Table 1.

Example 18
Preparation of a Cross-Linking Film from Copolymer (d) and TEOS (Both P and Sn were Added)

A film was prepared in same manner as in Example 6, except that copolymer (d) was used instead of copolymer (a). The properties of the resulting film are shown in Table 1.

Comparative Example 1
Preparation of a Cross-Linking Film from Copolymer (a) (Neither P nor Sn was Added)

A film was prepared in same manner as in Example 2, except that tributyl phosphite was not added. The polymer was not cross-linked at all under this condition. The properties of the resulting film are shown in Table 1.

Comparative Example 2
Preparation of a Cross-Linking Film from Copolymer (a) (P added, Sn not Added, 40° C. Hot Water Treatment)

A film was prepared in same manner as in Example 2, except that the film was treated with hot water at 40° C. instead of steam at 150° C. The polymer was not cross-linked at all under this condition. The properties of the resulting film are shown in Table 1.

Example 19 and Comparative Example 3

The composition solutions of Example 1–18 and Comparative examples 1–2 were applied to a polished surface of quartz using a spin coater to make coating films each having a dry thickness of 5 $\mu$m. The coatings were dried and cross-linked under the conditions of the Examples or Comparative Examples.

Toluene Resistance Test

One drop (about 20 mg) of toluene was dropped on a coating film and closed by covering with a PETRI dish or the like. The coating film was allowed to stand at 20° C. for 24 hours to evaluate the change of the film surface by naked eye observation.

⊚: No change in the configuration was observed.

○: A slight stain was observed.

Δ: The film swelled.

X: The film was completely dissolved.

Stickiness Evaluation

The aluminum surface was cut into 5×5 squares, 1 mm×1 mm each, and subjected to a peeling test using an adhesive cellophane tape to determine the number of peeled squares among 25 squares.

TABLE 1

| | Example | | | | | | | | | |
|---|---|---|---|---|---|---|---|---|---|---|
| | 1 | 2 | 3 | 4 | 5 | 6 | 7 | 8 | 9 | 10 |
| Copolymer | (a) | (a) | (a) | (a) | (a) | (a) | (a) | (a) | (a) | (a) |
| Additives | None | None | None | None | None | None | None | None | None | None |
| $H_2O$ treatment(° C.) | 150 | 150 | 150 | 150 | 150 | 150 | 150 | 150 | 150 | 150[*1] |
| Phosphorous acid catalyst | None | P1 | P2 | P3 | P4 | P5 | P6 | P7 | P8 | |
| Sn catalyst | Added | None | None | None | None | None | None | None | None | [*2] |
| Degree of non-swelling in toluene (%) | 500 | 200 | 210 | 200 | 200 | 190 | 240 | 230 | 210 | 450 |
| Tg (° C.) | 338 | 345 | 345 | 345 | 345 | 345 | 345 | 345 | 345 | 336 |
| Total light transmission (%) | 91 | 91 | 91 | 91 | 91 | 85 | 91 | 91 | 91 | 91 |
| Coefficient of linear expansion (ppm/° C.) | 81 | 58 | 58 | 58 | 58 | 58 | 58 | 58 | 58 | 65 |
| Liquid crystal resistance test | Δ | ⊚ | ⊚ | ⊚ | ⊚ | ⊚ | ⊚ | ⊚ | ⊚ | Δ |
| Stickiness | 0 | 0 | 0 | 0 | 0 | 0 | 0 | 0 | 0 | 0 |

| | Example | | | | | | | | Comparative Example | |
|---|---|---|---|---|---|---|---|---|---|---|
| | 11 | 12 | 13 | 14 | 15 | 16 | 17 | 18 | 1 | 2 |
| Copolymer | (a) | (a) | (a) | (a) | (a) | (a) | (a) | (a) | (a) | (a) |
| Additives | None | None | TEOS | TEOS | TEOS | TEOS | TEOS | TEOS | None | None |
| $H_2O$ treatment (° C.) | 150[*1] | 150 | 150 | 150 | 150 | 150 | 150 | 150 | 150 | 40 |
| Phosphorous acid catalyst | P1 | None | P1 | P1 | P1 | P1 | P1 | P1 | None | P1 |
| Sn catalyst | [*3] | Added | Added | None | Added | Added | Added | Added | None | None |
| Degree of non-swelling in toluene (%) | 250 | 200 | 190 | 160 | 150 | 190 | 200 | 210 | [*4] | [*4] |
| Tg (° C.) | 338 | 338 | 340 | 340 | 340 | 340 | 340 | 320 | 338 | 338 |
| Total light transmission (%) | 91 | 91 | 91 | 85 | 91 | 91 | 91 | 91 | 91 | 91 |
| Coefficient of linear expansion (ppm/° C.) | 65 | 54 | 52 | 45 | 45 | 52 | 49 | 58 | 88 | 88 |
| Liquid crystal resistance test | ○ | ⊚ | ○ | ⊚ | ⊚ | ⊚ | ⊚ | ⊚ | X | X |
| Stickiness | 0 | 0 | 0 | 0 | 0 | 0 | 0 | 0 | 4 | 4 |

[*1]Under atmospheric pressure
[*2]Sulfonium salt
[*3]Dioctyl phosphate
[*4]Dissolved
[*5]Number of peeled aluminum deposition blocks

TABLE 2

| | Copolymer | Cross-linking conditions of coatings | Additives | Phosphorous acid catalyst | Sn catalyst | Toluene resistance | Stickiness *1 |
|---|---|---|---|---|---|---|---|
| Example 19 | (a) | Steam, 150° C. | None | None | Added | Δ | 0 |
| | (a) | Steam, 150° C. | None | P1 | None | ⊚ | 0 |
| | (a) | Steam, 150° C. | None | P2 | None | ⊚ | 0 |
| | (a) | Steam, 150° C. | None | P3 | None | ⊚ | 0 |
| | (a) | Steam, 150° C. | None | P4 | None | ⊚ | 0 |
| | (a) | Steam, 150° C. | None | P5 | None | ⊚ | 0 |
| | (a) | Steam, 150° C. | None | P6 | None | ⊚ | 0 |
| | (a) | Steam, 150° C. | None | P7 | None | ⊚ | 0 |
| | (a) | Steam, 150° C. | None | P8 | None | ⊚ | 0 |
| | (a) | Atmospheric, 150° C. | None | Sulfonium salt | | Δ | 0 |
| | (a) | Atmospheric, 150° C. | None | Dioctyl phosphate | | ◯ | 0 |
| | (a) | Steam, 150° C. | None | P1 | Added | ⊚ | 0 |
| | (a) | Steam, 150° C. | TEOS | None | Added | ◯ | 0 |
| | (a) | Steam, 150° C. | TEOS | P1 | None | ⊚ | 0 |
| | (a) | Steam, 150° C. | TEOS | P1 | Added | ⊚ | 0 |
| | (a) | Steam, 150° C. | TEOS | P1 | Added | ⊚ | 0 |
| | (c) | Steam, 150° C. | TEOS | P1 | Added | ⊚ | 0 |
| | (d) | Steam, 150° C. | TEOS | P1 | Added | ⊚ | 0 |
| Comparative | (a) | Steam, 150° C. | None | None | None | X | 22 |
| Example 3 | (a) | Warn water, 40° C. | None | P1 | None | X | 20 |

*1: Number of peeled aluminum deposition blocks

Because the transparent optical material obtained from the cyclic olefin copolymer of the present invention excels in optical transparency, heat resistance, and adhesion, is cross-linkable, and exhibits superior solvent resistance, the material is suitably used for liquid crystal display substrates as a glass substitute. This material satisfies various characteristics such as heat resistance, washing solution resistance, transparency, adhesiveness, dimensional stability, and liquid crystal resistance during injection of liquid crystal, required for the substrate material in the processes of exposure, development and etching when a TFT (membrane transistor) is formed on the liquid crystal substrate.

Because of excellent optical transparency, heat resistance, adhesion, stickiness, and anti-hygroscopic properties, the transparent optical material obtained from the cyclic olefin copolymer of the present invention can be suitably used as a material for electronic parts such as a photo-conductive board, polarization film, liquid crystal panel, phase shift film, transparent conductive film, OHP film, optical disk, optical fiber, and lens, and as a medical container, and the like.

What is claimed is:

1. A composition, comprising:

a cyclic olefin addition copolymer which contains a recurring unit (a) shown by the following formula (1),

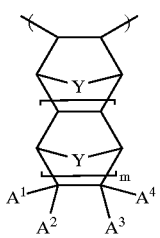

(1)

and a recurring unit (b) shown by the following formula (2),

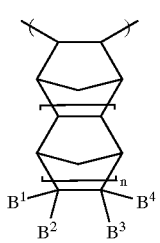

(2)

said composition further comprising a phosphorous acid ester compound, a hypophosphorous acid ester compound, or mixtures thereof;

wherein in formula (1), $A^1$ to $A^4$ individually represent a hydrogen atom, a hydrocarbon group having 1–20 carbon atoms, or an alkoxysilyl group or aryloxysilyl group represented by the formula $—(CR^1R^2)_f Si(OR^3)_g R^4_{(3-g)}$, $—(CR^1R^2)_f Si(R^3R^4)OSi(OR^3)_g R^4_{(3-g)}$, or $—(CR^1R^2)_f C(O)O(CH_2)_h Si(OR^3)_g R^4_{(3-g)}$;

wherein $R^1$ and $R^2$ individually represent a hydrogen atom or hydrocarbon group having 1–20 carbon atoms, $R^3$ is an alkyl group, alkenyl group, aryl group, or cycloalkyl group, each having 10 or less carbon atoms, $R^4$ is a hydrogen atom, halogen atom, or hydrocarbon group having 1–20 carbon atoms, f and h are an integer of 0–5, and g is an integer of 1–3, provided that at least one of $A^1$ to $A^4$ is an alkoxysilyl group or aryloxysilyl group, Y represents $—CH_2—$ or $—O—$, and m is 0 or 1;

wherein in formula (2), $B^1$, $B^2$, $B^3$, and $B^4$ individually represent a hydrogen atom or an alkyl group, aryl group, alkenyl group, or cycloalkyl group each having 20 or less carbon atoms, a halogen atom, a halogenated hydrocarbon group, or a polar group represented by $—(CH_2)_j X$;

wherein X represents a group $—C(O)OR^5$ or $—OC(O)R^6$, wherein $R^5$ and $R^6$ represent an alkyl group, alkenyl group, aryl group, cycloalkyl group, or derivatives of these groups, each having 20 or less carbon atoms, or halogen-substituted groups of these groups, and j is an integer of 0–5, or $B^1$ and $B^2$ or $B^3$ and $B^4$ form an alkylidenyl group in combination, or $B^1$ and $B^4$, $B^1$ and $B^3$, $B^2$ and $B^3$, or $B^2$ and $B^4$ form a cycloalkylene group or cycloalkenylene group in combination, and n is an integer of 0–2.

2. The composition according to claim 1, wherein the cyclic olefin addition copolymer contains 0.1–30 mol % of the recurring unit (a) shown by the formula (1) and 70–99.9 mol % of the recurring unit (b) shown by the formula (2), provided that a total of the recurring unit (a) and the recurring unit (b) is 100 mol %.

3. The composition according to claim 1, wherein a glass transition temperature of the cyclic olefin addition copolymer is 200° C. or more.

4. The composition according to claim 1, further comprising at least one compound selected from the group consisting of an organosilane shown by the following formula (6), $$(R^9)_q Si(OR^{10})_{4-q} \quad (6),$$

a hydrolyzate of the organosilane, and condensate of the organosilane;

wherein $R^9$ individually, when two or more are present, represents an organic group having 1–10 carbon atoms, $R^{10}$ individually represents an alkyl group having 1–5 carbon atoms or an acyl group having 1–6 carbon atoms, and q is an integer from 0–2, a hydrolyzate of the organosilane, and condensate of the organosilane.

5. The composition according to claim 1, further comprising particles of at least one member selected from the group consisting of silica, alumina, zirconia, titania, diatomite, montmorillonite, and tin oxide.

6. A film, sheet, or coating, comprising:
the composition according to claim 1.

7. A cross-linked material produced by cross-linking a cyclic olefin addition copolymer in a composition containing the cyclic olefin addition copolymer via siloxane bonds, wherein the cyclic olefin addition copolymer contains
a recurring unit (a) shown by the following formula (1),

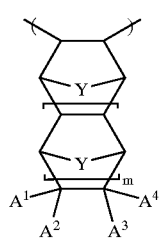

(1)

and a recurring unit (b) shown by the following formula (2),

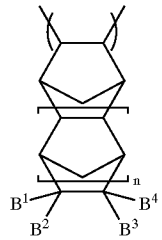

(2)

said composition further comprising a phosphorous acid ester compound, a hypophosphorous acid ester compound, or a mixture thereof;

wherein in formula (1), $A^1$ to $A^4$ individually represent a hydrogen atom, a hydrocarbon group having 1–20 carbon atoms, or an alkoxysilyl group or aryloxysilyl group represented by the formula $-(CR^1R^2)_f Si(OR^3)_g R^4_{(3-g)}$, $-(CR^1R^2)_f Si(R^3R^4)OSi(OR^3)_g R^4_{(3-g)}$, or $-(CR^1R^2)_f C(O)O(CH_2)_h Si(OR^3)_g R^4_{(3-g)}$;

wherein $R^1$ and $R^2$ individually represent a hydrogen atom or hydrocarbon group having 1–20 carbon atoms, $R^3$ is an alkyl group, alkenyl group, aryl group, or cycloalkyl group, each having 10 or less carbon atoms, $R^4$ is a hydrogen atom, halogen atom, or hydrocarbon group having 1–20 carbon atoms, f and h are an integer of 0–5, and g is an integer of 1–3, provided that at least one of $A^1$ to $A^4$ is an alkoxysilyl group or aryloxysilyl group, Y represents $-CH_2-$ or $-O-$, and m is 0 or 1, wherein in formula (2), $B^1$, $B^2$, $B^3$, and $B^4$ individually represent a hydrogen atom or an alkyl group, aryl group, alkenyl group, or cycloalkyl group each having 20 or less carbon atoms, a halogen atom, a halogenated hydrocarbon group, or a polar group represented by $-(CH_2)_j X$;

wherein X represents a group $-C(O)OR^5$ or $-OC(O)R^6$, wherein $R^5$ and $R^6$ represents an alkyl group, alkenyl group, aryl group, cycloalkyl group, or derivatives of these groups, each having 20 or less carbon atoms, or halogen-substituted groups of these groups, and j is an integer of 0–5, or $B^1$ and $B^2$ or $B^3$ and $B^4$ form an alkylidenyl group in combination, or $B^1$ and $B^4$, $B^1$ and $B^3$, $B^2$ and $B^3$, or $B^2$ and $B^4$ form a cycloalkylene group or cycloalkenylene group in combination, and n is an integer of 0–2.

8. The cross-linked material according to claim 7, comprising not more than 10 wt % of toluene soluble components.

9. The cross-linked material according to claim 7, having a degree of swelling in toluene measured at 25° C. of 300% or less.

10. The cross-linked material according to claim 7, having a coefficient of linear expansion determined at 80° C. of 70 ppm/° C. or less.

11. The cross-linked material according to claim 7, in the form of a film, a sheet, or a coating.

12. A transparent conductive substrate, comprising;
a film or a sheet made from the cross-linked material according to claim 7; and
a transparent conductive layer provided on said film or said sheet.

13. A method of manufacturing a cross-linked material according to claim 2, comprising heating the composition of claim 1 at 50° C. or more.

14. A method of manufacturing a cross-linked material according to claim 2, comprising causing the composition of claim 1 to come contact with hot water or steam at 50° C. or more.

15. A method of manufacturing a film, sheet, or coating according to claim 6, comprising heating the composition of claim 1 at 50° C. or more.

16. A method of manufacturing a film, sheet, or coating according to claim 6, comprising causing the composition of claim 1 to come contact with hot water or steam at 50° C. or more.

* * * * *

UNITED STATES PATENT AND TRADEMARK OFFICE
CERTIFICATE OF CORRECTION

PATENT NO.   : 6,639,021 B2
DATED        : October 28, 2003
INVENTOR(S)  : Noboru Oshima et al.

It is certified that error appears in the above-identified patent and that said Letters Patent is hereby corrected as shown below:

<u>Column 31,</u>
Lines 7 and 10, "according to claim 2," should read -- according to claim 7, --.

Signed and Sealed this

Eighteenth Day of May, 2004

JON W. DUDAS
*Acting Director of the United States Patent and Trademark Office*